US008738208B2

(12) United States Patent
Matsumoto

(10) Patent No.: US 8,738,208 B2
(45) Date of Patent: May 27, 2014

(54) PROPULSION CONTROL APPARATUS

(75) Inventor: Takeo Matsumoto, Tokyo (JP)

(73) Assignee: Mitsubishi Electric Corporation, Chiyoda-Ku, Tokyo (JP)

(*) Notice: Subject to any disclaimer, the term of this patent is extended or adjusted under 35 U.S.C. 154(b) by 210 days.

(21) Appl. No.: 13/511,705

(22) PCT Filed: Dec. 8, 2009

(86) PCT No.: PCT/JP2009/006692
§ 371 (c)(1),
(2), (4) Date: May 24, 2012

(87) PCT Pub. No.: WO2011/070609
PCT Pub. Date: Jun. 16, 2011

(65) Prior Publication Data
US 2012/0296507 A1    Nov. 22, 2012

(51) Int. Cl.
*B60L 9/00* (2006.01)

(52) U.S. Cl.
USPC .............................. 701/22; 318/800; 363/17

(58) Field of Classification Search
USPC .............. 701/22; 318/800; 363/17, 34, 37, 41
See application file for complete search history.

(56) References Cited

U.S. PATENT DOCUMENTS

| 5,250,890 A * | 10/1993 | Tanamachi et al. ........... 318/811 |
| 5,642,020 A | 6/1997 | Miyazaki |
| 2008/0179122 A1 | 7/2008 | Sugawara et al. |

FOREIGN PATENT DOCUMENTS

| EP | 2 001 124 A2 | 12/2008 |
| JP | 56-150903 A | 11/1981 |
| JP | 61-285078 A | 12/1986 |
| JP | 3-103008 A | 4/1991 |
| JP | 06-237502 A | 8/1994 |
| JP | 6-237502 A | 8/1994 |
| JP | 7-39010 A | 2/1995 |
| JP | 07-039010 A | 2/1995 |
| JP | 7-123501 A | 5/1995 |
| JP | 07-123501 A | 5/1995 |
| JP | 09-271101 A | 10/1997 |
| JP | 9-271101 A | 10/1997 |
| JP | 2002-271901 A | 9/2002 |
| JP | 2006-121816 A | 5/2006 |

OTHER PUBLICATIONS

Extended European Search Report issued Apr. 29, 2013, by the European Patent Office in corresponding European Patent Application No. 09852007.5. (8 pages).
International Search Report (PCT/ISA/210) issued on Mar. 16, 2010, by the Japanese Patent Office as the International Searching Authority for International Application No. PCT/JP2009/006692.
Office Action issued on Aug. 19, 2013, by the Canadian Patent Office in corresponding Canadian Patent Application No. 2,783,782. (3 pages).

* cited by examiner

*Primary Examiner* — Thomas Black
*Assistant Examiner* — Luke Huynh
(74) *Attorney, Agent, or Firm* — Buchanan Ingersoll & Rooney PC

(57) ABSTRACT

In a configuration in which an auxiliary power supply is connected to an intermediate link circuit of a main conversion unit, intermediate link voltage as input voltage of the auxiliary power supply is set at higher voltage depending on the main conversion unit as a main unit, and loss generated in a main circuit element of the auxiliary power supply increases; therefore, a problem has occurred that a cooling unit has to be increased in size. The main conversion unit recognizes a low-speed and stop state by monitoring a vehicle speed, and varies the intermediate link voltage corresponding to the vehicle speed; thereby, the loss generated in the main circuit element of the auxiliary power supply is reduced at the low-speed and stop state where cooling ability is decreased; as a result, small sizing and light weighting of the cooling unit is achieved.

6 Claims, 4 Drawing Sheets

PROPULSION CONTROL APPARATUS

TECHNICAL FIELD

The present invention relates to a propulsion control apparatus for an AC electric motor vehicle.

BACKGROUND ART

Electric motor vehicles are generally provided with an auxiliary power supply for supplying electric power to, for example, lighting and air conditioning systems therein. The loads (for example, the lighting and air conditioning systems) on the auxiliary power supply generate heat (loss), regardless of vehicle speed, in a main circuit element of the auxiliary power supply. Accordingly, cooling of the main circuit element is necessary. With respect to the cooling system for the main circuit element of the auxiliary power supply, a self ventilation type using ram wind induced by a running vehicle (running-vehicle wind) and a forced wind cooling type using a fan are applicable.

Because the strength of the running-vehicle wind depends on the vehicle speed, the cooling ability when a self ventilation type is adopted decreases with slowing of the vehicle speed, and becomes the lowest during stopping of the vehicle, while the running-vehicle wind cannot be expected. Accordingly, in order to secure the cooling ability under the worst condition, cooling of the main circuit element of the auxiliary power supply is designed in a windless state during the vehicle stop as a design condition.

On the other hand, regarding a configuration according to an electric power conversion system of an AC electric motor vehicle, in a case of a configuration in which the auxiliary power supply is connected to an intermediate link connection of a main conversion unit (converter-inverter), input voltage of the auxiliary power supply is an intermediate link voltage in the main conversion unit. Because the voltage generally depends on a main motor (motor for driving the vehicle) as a load on the main conversion unit, the voltage is set at a higher level, and thereby loss generated in the main circuit element tends to become larger than that in a configuration in which electric power is directly obtained from a main transformer.

Conventionally, as a measure for reducing the loss generated in the main circuit element of the electric power conversion system, as disclosed in Patent Document 1, a method has been known in which a DC-AC conversion means (inverter) and an AC-DC conversion means (converter) are controlled in response to load electric power, or input electric power, etc., as an example, input voltage of the inverter is changed to be high or low (for example, refer to Patent Document 1).

PRIOR ART DOCUMENTS

Patent Documents

[Patent Document 1]
Japanese Laid-Open Patent Publication 2006-121,816 (page 3-4, FIG. 4)

DISCLOSURE OF THE INVENTION

Problems to be Solved by the Invention

However, in a case of the above electric power conversion system having the configuration in which the auxiliary power supply is connected to the intermediate link connection, because the intermediate link voltage is set at the higher level, the loss generated in the main circuit element of the auxiliary power supply is larger. In addition, because the voltage depends on the main conversion unit as a main unit, input-voltage control, due to a matter of the auxiliary power supply, simply using the above prior art, of the inverter cannot also be performed; therefore, a problem has occurred that, in order to improve the cooling ability, the cooling unit needs to be increased in size.

An objective of the present invention, which is made to solve the above described problem, is to provide a propulsion control apparatus in which, in a case of a configuration where an auxiliary power supply is connected to an intermediate link connection of a main conversion unit, loss generated in a main circuit element of the auxiliary power supply is reduced.

Means for Solving the Problem

In a propulsion control apparatus according to the present invention is characterized to include a converter for converting AC into DC to output; an inverter for converting the DC outputted from the converter into AC to supply to a motor, by using a VVVF control method when vehicle speed is not higher than a VVVF limited speed, and a CVVF control method when the vehicle speed is higher than the VVVF limited speed; a filter capacitor provided at an intermediate link connection between the converter and the inverter; an auxiliary power supply, connected to the intermediate link connection, cooled by a self ventilation system; and a converter control unit, into which information of the vehicle speed is inputted, for decreasing, based on the information, voltage at the intermediate link connection to a value at which temperature increase of the auxiliary power supply is within a limit, when vehicle speed indicated by the information of the vehicle speed is not higher than a predetermined speed which is lower than the VVVF limited speed and lower than a lower-limit of a vehicle-speed range where input current into the converter is constant.

Advantageous Effect of the Invention

According to the present invention, a propulsion control apparatus can be provided in which, in the case of the configuration in which the auxiliary power supply is connected to the intermediate link connection of the main conversion unit, the loss generated in the main circuit element of the auxiliary power supply is reduced.

BEST MODE FOR CARRYING OUT THE INVENTION

Embodiment 1

Figure 1:
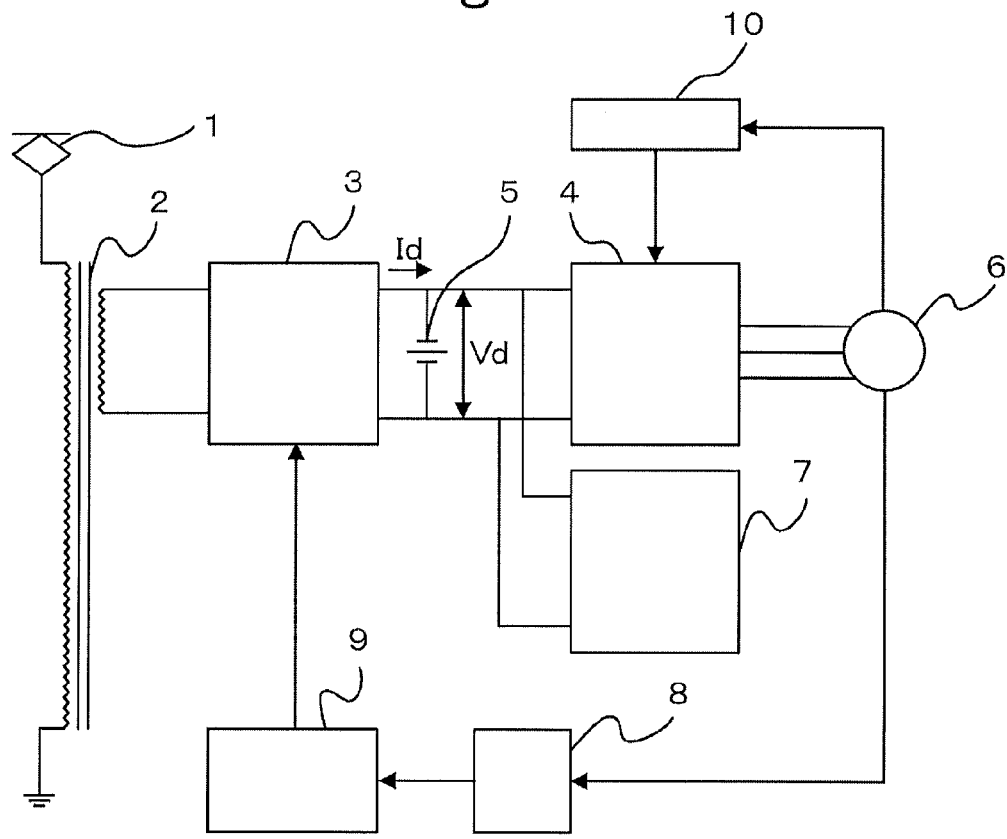
FIG. 1 is a diagram illustrating an example of a configuration of an electric power conversion system according to Embodiment 1 of the present invention.

FIG. 1 is a diagram illustrating a configuration example of an electric power conversion system according to Embodiment 1 of the present invention. In FIG. 1, the electric power conversion system is mounted in an AC electric motor vehicle, and AC current transmitted from a power station through a power line is inputted from a pantograph 1. A main transformer 2 converts voltage outputted from the pantograph 1 to output.

A converter 3 converts the output of the main transformer 2 from AC to DC. The voltage outputted from the converter 3 is an intermediate link voltage. An inverter 4 converts the output of the converter 3 from DC to three-phase AC. A filter capacitor 5 is provided on the DC output side of the converter 3, which removes output noises of the converter 3 and smoothes the intermediate link voltage. The three-phase AC is inputted from the inverter 4 into a main motor 6 to drive the electric motor vehicle. An auxiliary power supply 7 is connected to an intermediate DC circuit, which is a power supply that supplies electric power, for example, to lighting and air conditioning systems. Here, the inverter 4 outputs, regardless of the intermediate link voltage, electric power according to the speed of the electric motor vehicle.

An intermediate link voltage command generation unit 8 creates an intermediate link voltage command Vd* according to a rotor frequency FM of the main motor 6 (corresponding to the vehicle speed). A converter control unit 9 is a converter control unit for creating, by the voltage command Vd*, gate pulse signals for actually driving a main circuit element of the converter 3. In an inverter control unit 10 the rotor frequency FM of the main motor 6 is inputted; thereby, the inverter 4 is controlled.

In FIG. 1, a propulsion control apparatus is configured with the converter 3, inverter 4, filter capacitor 5, intermediate link voltage command generation unit 8, converter control unit 9, and inverter control unit 10.

The converter control unit 9 receives the voltage command Vd* from the intermediate link voltage command generation unit 8, and then, for example, operates as follows. First, the converter control unit 9 calculates a converter voltage command value so that the intermediate link voltage matches the voltage command Vd* received from the intermediate link voltage command generation unit 8.

Moreover, the converter control unit 9 creates the gate pulse signals driving the main circuit element of the converter 3 based on the voltage command value, and controls the converter 3 by transmitting the gate pulse signals to the converter 3. According to this operation, the output of the converter 3 can be controlled so that the intermediate link voltage Vd matches the voltage command Vd*.

A conventional converter control unit of an electric power conversion system for an AC electric motor vehicle generally controls the converter 3 so as to maintain the intermediate link voltage at a constant level. In contrast to this, in the converter control unit 9 of the electric power conversion system according to Embodiment 1 of the present invention, as described later, because the voltage command Vd* varies with the vehicle speed, the converter 3 is controlled so that the gate pulse signals are created corresponding thereto and the intermediate link voltage Vd is varied with the vehicle speed.

The cooling system of the auxiliary power supply 7 according to Embodiment 1 of the present invention is self-ventilation type. The main circuit element of the auxiliary power supply 7 is provided on a heat conducting plate, and a heat radiation fin is connected to the heat conducting plate. Heat generated in the main circuit element conducts from the heat conducting plate to the heat radiation fin, and radiates from the heat radiation fin into the atmosphere; thereby, the cooling is performed.

Because the strength of the running-vehicle wind depends on the vehicle speed, the cooling ability of the cooling unit decreases with slowing of the vehicle speed, and becomes the lowest during stopping of the vehicle, while the running-vehicle wind cannot be expected. Accordingly, in order to secure the cooling ability under the worst condition, cooling design is performed, for the main circuit element of the auxiliary power supply 7, in a windless state during the vehicle stop as a design condition. As a method of improving the cooling ability, a method of size-increasing of the entire cooling unit can be considered; however, the weight of the cooling unit increases with the size increase, and securing of a larger space becomes necessary. Additionally, the cost of the cooling unit also increases.

Figure 2:
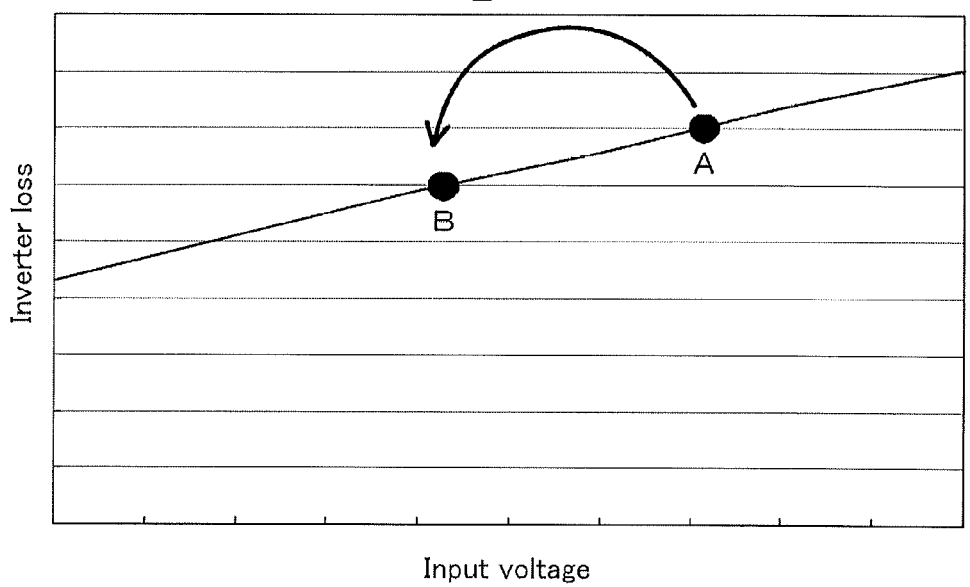
FIG. 2 is a graph representing an example of a relationship between input voltage of an auxiliary power supply of Embodiment 1 of the present invention and inverter loss in a main circuit element of the auxiliary power supply.

FIG. 2 is a graph representing an example of a relationship between input voltage of the auxiliary power supply 7 and inverter loss of the main circuit element in the auxiliary power supply 7. In FIG. 2, the horizontal axis represents the input voltage of the auxiliary power supply 7, while the vertical axis represents the inverter loss of the main circuit element in the auxiliary power supply 7. As indicated by an arrow in FIG. 2, when the input voltage of the auxiliary power supply 7 is decreased, the inverter loss of the main circuit element can be reduced. However, in the configuration according to Embodiment 1 in which the intermediate link voltage is set to the input voltage of the auxiliary power supply 7, the input voltage of the auxiliary power supply 7 cannot be easily decreased; therefore, the generation loss cannot be reduced.

Accordingly, in the propulsion control apparatus according to Embodiment 1 of the present invention, by varying the intermediate link voltage with the vehicle speed, the loss generated in the main circuit element of the auxiliary power supply 7 is decreased. Hereinafter, this point is explained in detail.

Figure 3:
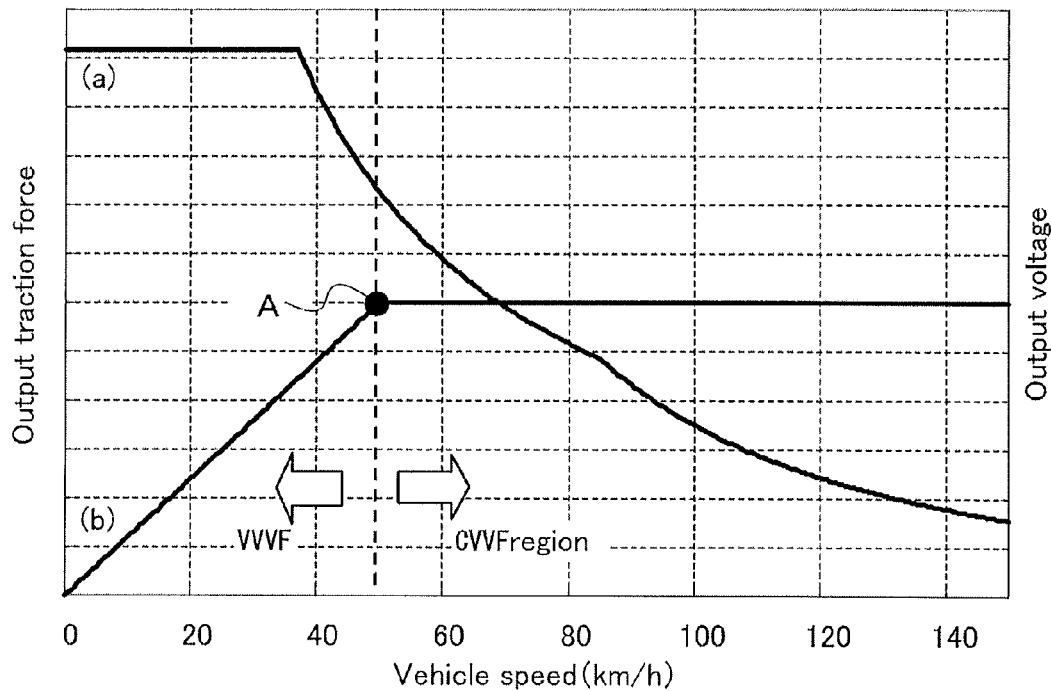
FIG. 3 is a graph representing relationships between (a) a vehicle speed and output traction force, and (b) a vehicle speed and an output voltage in an ordinary main conversion unit.

FIG. 3 is a graph representing relationships between a vehicle speed and (a) output traction force and (b) output voltage in general main conversion units including the main conversion unit according to Embodiment 1. The horizontal axis represents the vehicle speed, the curve (a) represents the output traction force of the main motor 6, and the curve (b) represents the output voltage of the inverter 4 mounted in the main conversion unit. In FIG. 3, the higher speed side of Point A is the CVVF (constant voltage variable frequency) region, while the lower speed side is the VVVF (variable voltage variable frequency) region. The vehicle speed at Point A is referred to as a VVVF limited speed.

The CVVF region is a region in which the inverter 4 operates at the maximum modulation factor so that the main motor 6 outputs predetermined performance characteristics, where the output voltage of the inverter 4 is constant independent from the vehicle speed. Because operation of varying the intermediate link voltage in this region is equivalent to vary the output voltage of the inverter 4, this operation cannot be performed.

On the other hand, the VVVF region (region in which the vehicle speed is not higher than the VVVF limited speed) is a region in which the output voltage of the inverter 4 is controlled by setting the modulation factor variable, where the output voltage of the inverter 4 varies with the vehicle speed. The intermediate link voltage can be varied in this region; thereby, an operation of varying the intermediate voltage can be performed.

Figure 4:
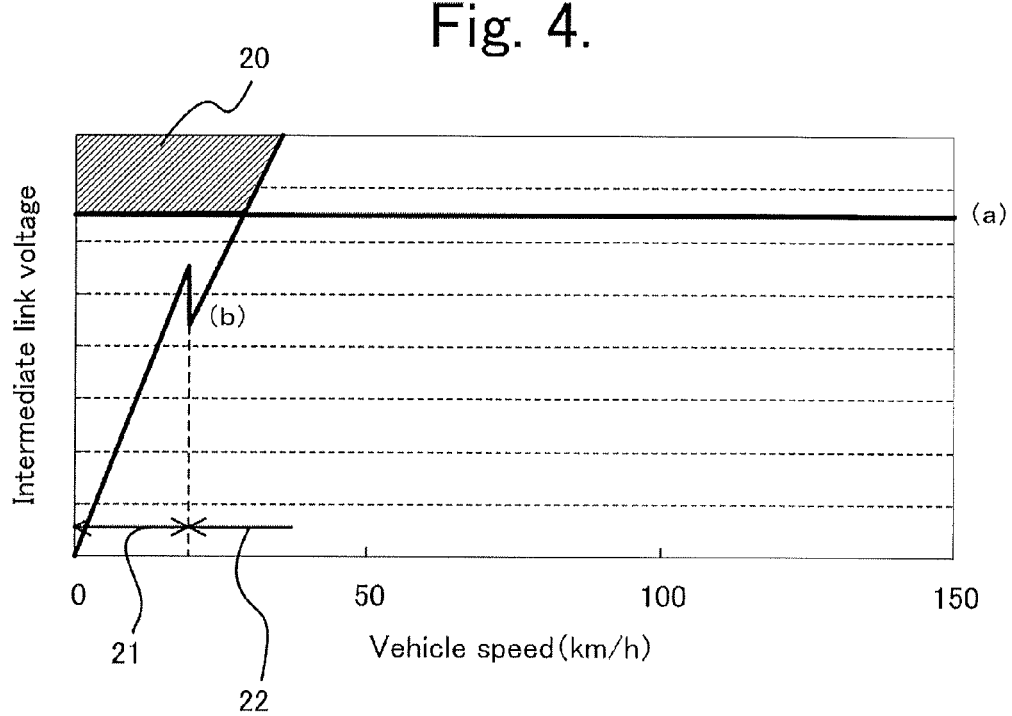
FIG. 4 is a graph representing a region where intermediate link voltage is controllable.

FIG. 4 is a graph representing a relationship between the vehicle speed and the intermediate link voltage. The horizontal axis represents the vehicle speed, while the vertical axis represents the intermediate link voltage. In this figure, numeral 21 denotes an asynchronous mode operation of the inverter modulation, while numeral 22 denotes a synchronous mode operation. In the VVVF region, while varying of the intermediate link voltage is admitted, the variation method is determined under the following condition.

First, because the intermediate link voltage controllable by the converter 3 has a lower limit, the intermediate link voltage has not to be lower than this value. An example of the lower limit was represented by a straight line (a) in FIG. 4. According to this limitation, the intermediate link voltage has to be a value higher than that of the straight line (a) in FIG. 4.

On the other hand, because an upper limit of the output modulation factor of the inverter 4 in the VVVF region is determined by the modulation mode (pulse mode) (for example, approximately, 0.8-0.9 for the asynchronous mode, and 0.98-0.99 for the synchronous mode), a lower limit for outputting the output voltage indicated by (b) in FIG. 3 exists for the intermediate link voltage. An example of this lower limit is represented by curve (b) in FIG. 4.

Under these imitations, the intermediate link voltage can be controlled within a region 20 indicated by oblique lines in FIG. 4.

Figure 5:
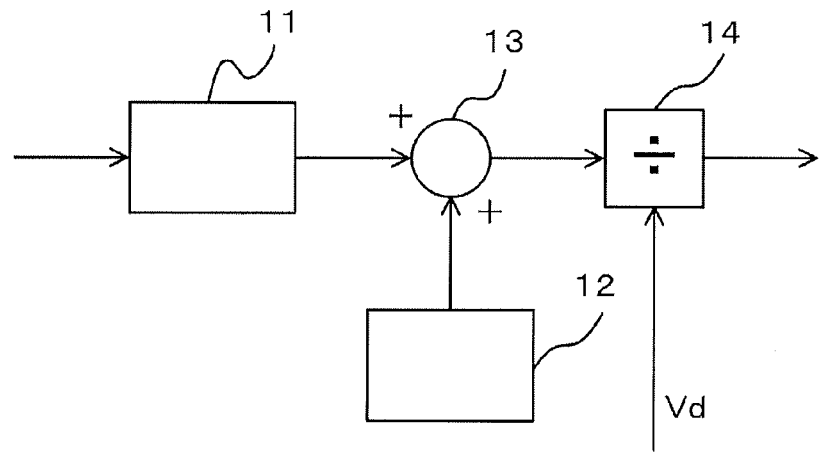
FIG. 5 is a configuration diagram illustrating an inverter control unit according to Embodiment 1 of the present invention.

Here, the output modulation factor in the inverter control unit 10 is calculated as explained below; thereby, the inverter 4 is controlled. FIG. 5 is a configuration diagram illustrating a configuration of the inverter control unit 10. The frequency FM is inputted from the main motor 6 into an output voltage calculation unit 11 represented in FIG. 5. In the VVVF region, the output voltage calculation unit 11 into which the rotor frequency FM has been inputted calculates the output voltage of the inverter 4 so as to be along the proportional straight line in FIG. 3, and then outputs the output voltage.

A compensation amount calculation unit 12 calculates a compensation amount using an output current command and its output current feedback, and then outputs the compensation amount. In a summation calculation unit 13, the output voltage outputted from the output voltage calculation unit 11 and the compensation amount outputted from the compensation amount calculation unit 12 are summed, and then the summing value is outputted to a division calculation unit 14. In the division calculation unit 14, the output modulation factor is calculated by dividing the summing value outputted from the summation calculation unit 13 by an actual detection value of the intermediate link voltage Vd; thereby, the output voltage of the inverter 4 is controlled so that the value becomes the output modulation factor.

Figure 6:
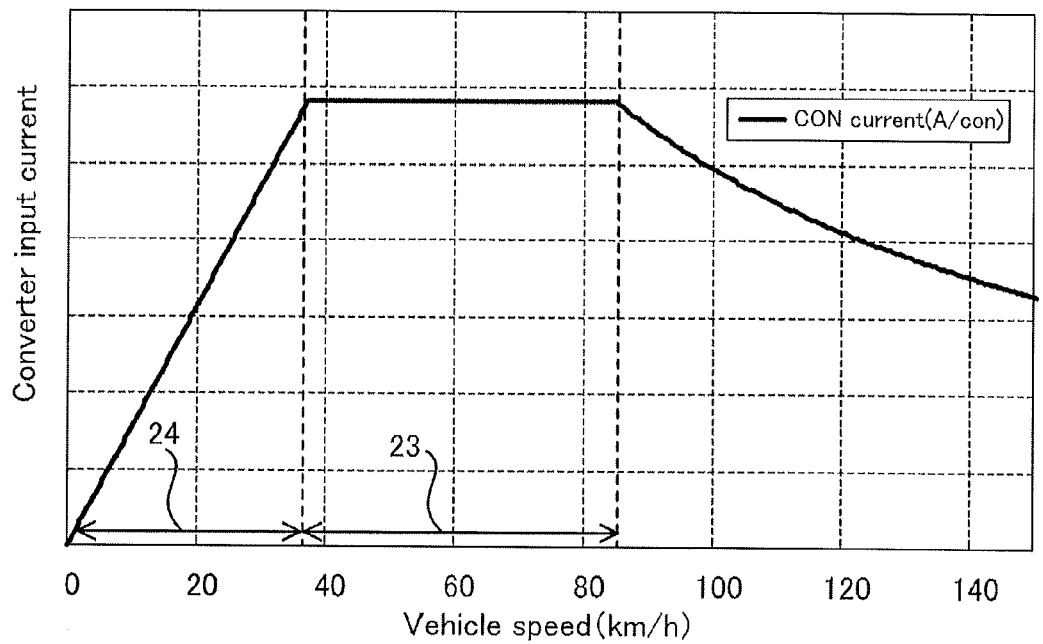
FIG. 6 is a graph representing a relationship between a vehicle speed and converter input current in the general main conversion unit.

Moreover, the current inputted into the converter 3 does not vary even though the intermediate link voltage Vd is varied, but the converter output current (DC current) Id varies. FIG. 6 is a graph representing a relationship between the vehicle speed and the converter input current in the general main conversion units including the main conversion unit according to Embodiment 1. The horizontal axis represents the vehicle speed, the curve represents the converter input current. In a constant power region 23, in which the converter input current is constant, represented in FIG. 6, the product of the intermediate link voltage Vd and the converter output current Id is a constant value. In addition, because each of parts such as conductors and terminals is generally designed by assuming that the converter output current Id in the constant power region 23 is the maximum value thereof, the value of Id cannot generally be increased more than this value in the constant power region 23. Therefore, the intermediate link voltage Vd cannot generally be decreased in the constant power region 23.

On the other hand, in a constant torque region 24, the product of the intermediate link voltage Vd and the converter output current Id decreases with decreasing vehicle speed. Therefore, in the constant torque region 24, decreasing of the intermediate link voltage Vd is admitted within a range in which the converter output current Id does not exceed the maximum value (the value of the converter output current Id in the constant power region 23).

Figure 7:
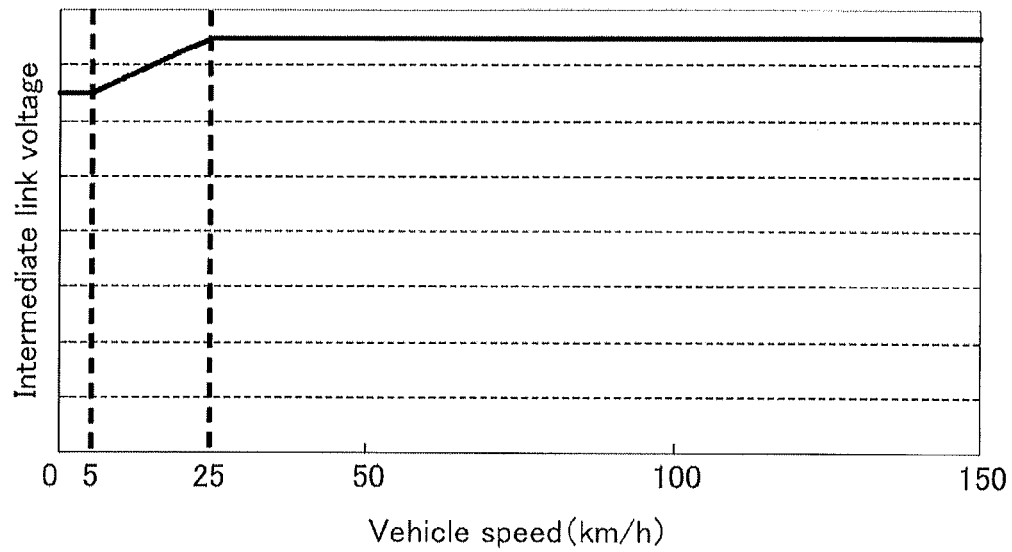
FIG. 7 is an example of output of an intermediate link voltage command generation unit according to Embodiment 1 of the present invention.

As described above, the intermediate link voltage is possible to be varied within the VVVF region in FIG. 3, for example as represented in FIG. 2, the intermediate link voltage can be varied stepwise from the operating point A to the operating point B. FIG. 7 is an example of output of the intermediate link voltage command generation unit 8 according to Embodiment 1 of the present invention. The horizontal axis represents the vehicle speed, while the vertical axis represents the intermediate link voltage. The intermediate link voltage command generation unit 8 is set so that the intermediate link voltage becomes lower during the vehicle running at a low speed, and stopping. By setting a table, corresponding to FIG. 7, in the intermediate link voltage command generation unit 8 illustrated in FIG. 1, the intermediate link voltage is controlled by the converter 3 at a lower value during the vehicle running at the lower speed and stopping; thereby, the loss generated in the auxiliary power supply 7 can be reduced.

Here, in the table corresponding to FIG. 7, the intermediate link voltage is controlled to decrease only in the region 20 as indicated by the oblique lines in FIG. 4.

Figure 8:
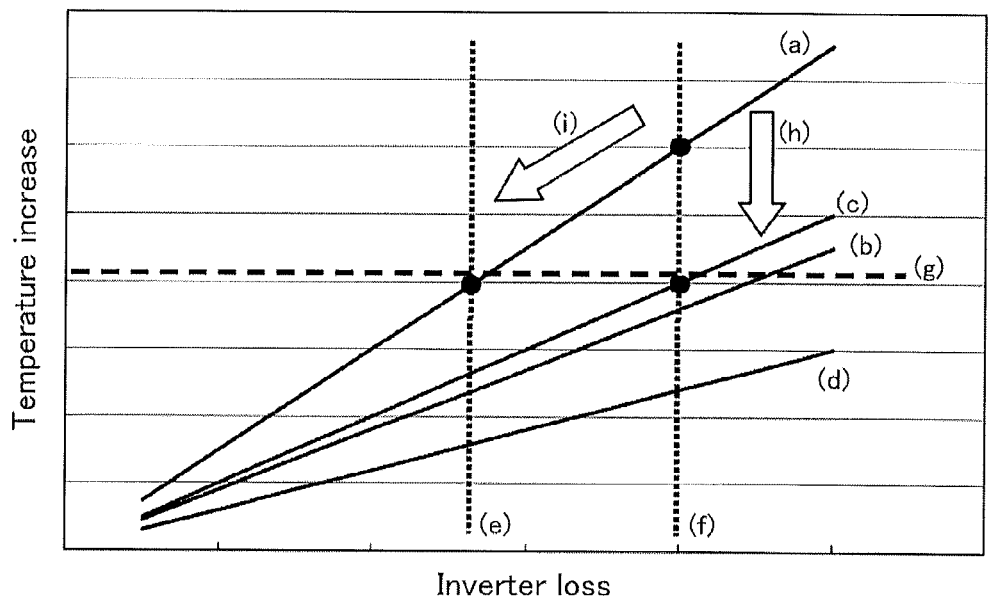
FIG. 8 is a graph representing examples of the loss generated in the main circuit element of the auxiliary power supply and temperature increase thereof.

FIG. 8 is a graph representing an example of relationships between generation loss and temperature increase in the main circuit element of the auxiliary power supply 7. The horizontal axis represents inverter loss in the main circuit element of the auxiliary power supply 7, while the vertical axis represents values of the temperature increase. Each of the operations is indicated, that is, a straight line (a) indicates a case of the cooling-unit size not being increased, and the vehicle speed being at a lower level, a straight line (b) indicates a case of the cooling-unit size not being increased, and the vehicle speed being at a higher level, a straight line (c) indicates a case of the cooling-unit size being increased, and the vehicle speed being at the same speed as that of the straight line (a) (at the lower level), and a straight line (d) indicates a case of the cooling-unit size being increased similarly to the straight line (c), and the vehicle speed being at the same speed as that of the straight line (b) (at the higher level). A broken line (e) indicates an inverter loss line at the operating point B in FIG. 2, while a broken line (f) indicates an inverter loss line at the operating point A in FIG. 2. Moreover, a dotted line (g) indicates a limit line of the temperature increase of the main circuit element.

In FIG. 8, in a case of the self ventilation type cooling unit by which running-vehicle wind can be expected, the value of temperature increase is higher at a low speed comparing to a high speed for the same inverter loss. For example, when the operation is performed at the operating point A indicated by the broken line (f), because, as indicated by the straight line (a), the temperature-increase value at the low speed in the small-size cooling unit cannot be satisfied with the limit line (g), by increasing the size of the cooling unit as indicated by an arrow (h) in FIG. 8, the operation has to be performed as indicated by the straight line (c). In contrast, in the present invention, by controlling the main conversion unit to reduce the inverter loss, as indicated by an arrow (i), so that the operating point A in FIG. 2 moves to the operating point B in FIG. 2, the temperature-increase value can be suppressed to a level not higher than the limit line (g); thereby, the cooling unit is not needed to be increased in size.

As described above, in the electric power conversion system having the configuration in which the auxiliary power supply 7 is connected to the intermediate link connection of the main conversion unit, the propulsion control apparatus according to Embodiment 1 of the present invention can reduce the loss generated in the main circuit element of the auxiliary power supply 7, when the self ventilation type is adopted as the system for cooling the main-circuit semiconductor of the auxiliary power supply 7, Unnecessary increase in size of the cooling unit is prevented, and thus small sizing and light weighting thereof can be achieved.

Additionally, temperature increase inside the case of the auxiliary power supply 7 can be reduced, and reliability improvement and life-time extension of the parts can be performed.

Here, in Embodiment 1, the rotor frequency FM of the main motor 6 is used as the vehicle speed information; however, other information corresponding to the vehicle speed may be used instead thereof. For example, the number of axle rotation used in a protection system of a T car may be used.

EXPLANATION OF REFERENCES

1: Pantograph
2: Main transformer
3: Converter
4: Inverter
5: Filter capacitor
6: Main motor
7: Auxiliary power supply
8: Intermediate link voltage command generation unit
9: Converter control unit
10: Inverter control unit
11: Output voltage calculation unit
12: Compensation amount calculation unit
13: Summation calculation unit
14: Division calculation unit

What is claimed is:

1. A propulsion control apparatus comprising:
a converter for converting AC into DC to output;
an inverter for converting the DC outputted from the converter into AC to supply to a motor, by using a VVVF control method when vehicle speed is not higher than a VVVF limited speed and a CVVF control method when the vehicle speed is higher than the VVVF limited speed;
a filter capacitor provided at an intermediate link connection between the converter and the inverter;
an auxiliary power supply, connected to the intermediate link connection, cooled by a self ventilation system; and
a converter control unit, into which information of vehicle speed is inputted, for decreasing, based on the information, voltage at the intermediate link connection to a value at which temperature increase of the auxiliary power supply is within a limit, when vehicle speed indicated by the information of the vehicle speed is not higher than a predetermined speed which is lower than the VVVF limited speed and lower than a lower limit of a vehicle-speed range where input current into the converter is constant.

2. A propulsion control apparatus as recited in claim 1, wherein the information of the vehicle speed is the number of axle rotation.

3. A propulsion control apparatus as recited in claim 1, wherein the information of the vehicle speed is a rotor frequency of the motor.

4. A propulsion control apparatus comprising:
a converter for converting AC into DC to output;
an inverter for converting the DC outputted from the converter into AC to supply to a motor, by using a VVVF control method when vehicle speed is not higher than a VVVF limited speed, and a CVVF control method when the vehicle speed is higher that the VVVF limited speed;
a filter capacitor provided at an output side of the converter;
an auxiliary power supply, connected in parallel to the filter capacitor, cooled by a self ventilation system; and
a converter control unit, into which information of the vehicle speed is inputted, for decreasing, based on the information, output voltage of the converter to a value at which temperature increase of the auxiliary power supply is within a limit, when vehicle speed indicated by the information of the vehicle speed is not higher than a predetermined speed which is lower than the VVVF limited speed and lower than a lower-limit of a vehicle-speed range where input current into the converter is constant.

5. A propulsion control apparatus as recited in claim 4, wherein the information of the vehicle speed is a rotor frequency of the motor.

6. A propulsion control apparatus as recited in claim 4, wherein the information of the vehicle speed is the number of axle rotation.

* * * * *